US007031329B2

(12) United States Patent
Lipsanen

(10) Patent No.: US 7,031,329 B2
(45) Date of Patent: Apr. 18, 2006

(54) TELECOMMUNICATION NETWORK SYNCHRONIZATION

(75) Inventor: Mikko Antero Lipsanen, Aura (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 706 days.

(21) Appl. No.: 09/737,324

(22) Filed: Dec. 14, 2000

(65) Prior Publication Data

US 2001/0005361 A1 Jun. 28, 2001

(30) Foreign Application Priority Data

Dec. 22, 1999 (GB) .................................... 9930132

(51) Int. Cl.
*H04L 12/28* (2006.01)
*H04L 7/00* (2006.01)
*H04J 3/06* (2006.01)

(52) U.S. Cl. ...................... 370/408; 370/519; 370/520; 375/356; 709/248

(58) Field of Classification Search ........ 370/254–256, 370/315, 324, 350, 390, 400, 408, 410, 503, 370/509–516, 519, 520, 522, 393; 375/354, 375/356, 362, 364–366; 709/248
See application file for complete search history.

(56) References Cited

U.S. PATENT DOCUMENTS

| | | | | |
|---|---|---|---|---|
| 4,736,393 | A * | 4/1988 | Grimes et al. | 375/356 |
| 5,001,730 | A * | 3/1991 | Franaszek et al. | 375/356 |
| 5,124,698 | A * | 6/1992 | Mustonen | 340/7.26 |
| 5,699,388 | A * | 12/1997 | Wang et al. | 375/356 |
| 5,784,421 | A * | 7/1998 | Dolev et al. | 375/354 |
| 5,796,793 | A * | 8/1998 | Kainulainen | 375/356 |
| 5,875,179 | A * | 2/1999 | Tikalsky | 370/315 |
| 5,881,243 | A * | 3/1999 | Zaumen et al. | 709/241 |
| 6,028,853 | A * | 2/2000 | Haartsen | 370/338 |
| 6,130,889 | A * | 10/2000 | Feldman et al. | 370/397 |
| 6,157,957 | A * | 12/2000 | Berthaud | 709/248 |
| 6,567,422 | B1 * | 5/2003 | Takeguchi et al. | 370/503 |
| 6,611,872 | B1 * | 8/2003 | McCanne | 709/238 |
| 6,671,291 | B1 * | 12/2003 | Soliman | 370/503 |
| 6,747,996 | B1 * | 6/2004 | Holloway et al. | 370/503 |

FOREIGN PATENT DOCUMENTS

| | | |
|---|---|---|
| EP | 0 450 828 A2 | 3/1991 |
| EP | 0626769 A2 | 11/1994 |
| WO | 95/24801 | 9/1995 |
| WO | 96/39760 | 12/1996 |
| WO | 97/33396 | 9/1997 |
| WO | 98/35466 | 8/1998 |

* cited by examiner

*Primary Examiner*—John Pezzlo
*Assistant Examiner*—Gregory B. Sefcheck

(57) ABSTRACT

A method of synchronizing nodes of a telecommunication network in which a master node is coupled to a Primary Reference Clock (PRC) and a plurality of slave nodes are each arranged to synchronize their internal clocks to the PRC using data received on incoming data links. The method includes propagating Synchronization Status Messages through the network from the master node, with each node through which a message passes incorporating into the message its own identity, thereby generating in each message a node path which has been followed by the message. For each incoming link of each node, the path or path length of a Synchronization Status Message received on that link is registered as an attribute for that link.

14 Claims, 7 Drawing Sheets

TELECOMMUNICATION NETWORK SYNCHRONIZATION

FIELD OF THE INVENTION

The present invention relates to the synchronisation of nodes in a telecommunication network and in particular, though not necessarily, to the synchronisation of nodes in a Universal Mobile Telecommunications System network.

BACKGROUND TO THE INVENTION

In a digital communication network, such as a telecommunications network or a private network having several private branch exchanges, it is often necessary to synchronise the time clocks of respective network nodes in order to ensure correct operation of the network. Network synchronisation permits all nodes on the network to operate from a common time base. This means that when one node (i.e. an intersection point) sends data to another node, both nodes can be expected to operate at approximately the same rate ensuring the successful transfer of data between the nodes. Background information on the need for network node synchronisation can be found in EP0450828.

In so-called "master-slave" synchronisation, one master node is chosen to distribute high quality clock signals (generated by a Primary Reference Clock (PRC)) to all slave nodes in a hierarchy of network nodes. The master node distributes PRC clock signals to adjacent nodes which in turn distribute the received and regenerated clock signals to their adjacent nodes until all the nodes in the network are using the same clock origin.

The need for synchronisation is especially important in mobile telecommunication networks, and will become even more so with the introduction of Universal Mobile Telecommunications System (UMTS) networks where the UMTS Terrestrial Radio Access Network (UTRAN) places very severe limits on network synchronisation.

A typical UTRAN configuration consists of Radio Network Controllers (RNCs) which perform switching functions in the network (analogous in some ways with conventional telephone exchanges and with Mobile Switching Centres of GSM networks) and Radio Base Stations (RBSs) which provide the interface between the UTRAN and the mobile terminals (each RBS being responsible for a given cell). The RNCs and RBSs are arranged in a hierarchy (or hierarchies) with a single RNC possibly being responsible for tens of RBSs. The link structure in a UTRAN may be complex, with nodes of the same type being linked to one another as well as to nodes of a different type. In certain circumstances, synchronisation may be taken from a co-located GSM network or UTRAN synchronisation may be utilised in GSM nodes.

In the event of a synchronisation failure, e.g. due to the failure of a link between two nodes, action must be taken quickly to re-establish synchronisation. This usually means selecting for the node suffering from the effects of the failure (as well as for other nodes downstream of that node) an alternative incoming link which can be used to achieve synchronisation. Typically, certain incoming links are preferred to other links for this purpose, and the selection of an appropriate link requires a network level administration system which is connected to all network nodes. This work requires each node of the network to have a complete knowledge of the network and, in failure situations, the network synchronisation can suffer from unforeseen combinations of the network nodes.

WO95/24801 describes a method of synchronising a network by propagating synchronisation messages down through a hierarchy of network nodes. The synchronisation messages each comprise a master node address, a distance-to-master node, indicated as the number of intermediate nodes through which the message has passed, and the identity of the transmitting node. Each node through which a message passes, increases a distance counter by 1 and changes the transmitting node identity to its own identity. The path field allows receiving nodes to prioritise incoming links for synchronisation purposes.

WO96/39760 describes a method of detecting timing loops in a Synchronous Digital Hierarchy (SDH) network by sending a synchronisation message consisting of the identities of all the nodes through which the synchronisation message has passed. The synchronisation message also contains a count of the number of nodes through which clock signal has passed. This is used to prevent excessively long synchronisation chains.

SUMMARY OF THE INVENTION

It is an object of the present invention to overcome or at least mitigate the disadvantages of known synchronisation networks. In particular, it is an object of the present invention to provide a synchronisation network in which synchronisation problems may be overcome substantially on a node level, automatically and with no or minimal operator intervention. It is a second object of the present invention to allow for the fast stabilisation of a network synchronisation process. It is a third object of the present invention to allow newly introduced network nodes to be rapidly synchronised with the network.

According to a first aspect of the present invention there is provided a method of synchronising nodes of a telecommunication network in which a master node is coupled to a Primary Reference Clock (PRC) and a plurality of slave nodes are each arranged to synchronise their internal clock to the PRC using data received on incoming data link, the method comprising:

- propagating Synchronisation Status Messages through the network from the master node, with each node through which a message passes incorporating into the message its own identity, thereby generating in each message a path which has been followed by the message;
- introducing a delay in the propagation of the messages at at least certain of the network nodes; and
- for each of at least some of the incoming links of each node, registering the path and/or path length of a Synchronisation Status Message received on a link as an attribute for that link.

Embodiments of the present invention allow a node to compare the merits of different incoming data links as sources of synchronisation information. In the event that synchronisation (or re-synchronisation) is required, the node may select that incoming link having an attribute indicating the shortest path length from the master node. The introduction of a delay in the propagation of messages at at least certain nodes, increases the probability that a synchronisation message will be received first at a given node over a shorter path, rather than over a longer path. This will tend to decrease the overall time taken to synchronise the network.

It will be appreciated that it is necessary to propagate Synchronisation Status Messages on initialising a new network. Synchronisation Status Messages may also be broadcast periodically or at other intervals thereafter in order to enable the network to cope with dynamic changes in network architecture (e.g. due to the failure of an inter-node link or the introduction of a new link or node).

Synchronisation Status Messages may be generated in response to receipt at the master node of a Synchronisation Status Request Message sent from another network node. Such a Request Message may be sent be a new node upon introduction to the network. A Synchronisation Status Message may be generated by a slave node in response to receipt at that slave node of a Synchronisation Status Request Message sent from a neighbouring slave node, with the Synchronisation Status Message including an identification of the path over which the sending slave node has been synchronised.

A node through which a Synchronisation Status Message passes may additionally add to the message its own "distance" from the master node. This distance may be defined by way of the number of node-to-node hops made by the message to get from the master node to the current node. Nodes adjacent to the master node have a distance of PRC+1, nodes adjacent to nodes having a distance of PRC+1 have a distance of PRC+2, etc. For each incoming link, a node may register the distance included in a Synchronisation Status Message received on that link as an attribute for that link.

The present invention is particularly applicable to mobile telecommunications networks such as GSM and UMTS (more particularly to the UTRAN part of a UMTS network). However, the invention is also applicable to fixed line networks such as Public Switched Telephone Networks (PSTNs).

The delay introduced by a slave node may be the same for all slave nodes which introduce a delay. Alternatively, the delay may increase with distance from the master node. Preferably, slave nodes neighbouring the master node do not introduce a delay.

The delay to be introduced by a node may be incorporated into a Synchronisation Status Message. This avoids the need to have delay tables at all network nodes. However, in the alternative, delay tables may be present at all nodes.

According to a second aspect of the present invention there is provided a telecommunications network comprising a master node coupled to a Primary Reference Clock (PRC) and a plurality of slave nodes, each of the slave nodes being arranged to synchronise their internal clock to the PRC using data received on incoming data link, each of the slave nodes comprising:

- means for receiving on the or each of at least some of the incoming links to the node, a Synchronisation Status Message incorporating the identities of the nodes through which the message has passed;
- means for registering the path or path length of the Synchronisation Status Message as an attribute for the link on which it was received;
- means for incorporating into one of said messages the identity of the node, thereby generating in the message a path which has been followed by the message; and
- means for propagating the modified Synchronisation Status Message to neighbouring nodes using outgoing links,
- wherein at least certain of the nodes in the network are arranged to introduce a delay in the propagation of the respective modified messages.

It will be appreciated that a receiving node will synchronise on the best incoming link, as identified by the paths of the Synchronisation Status Messages received on the incoming links. The Synchronisation Status Message received on the best incoming link is the message to which the node will incorporate its identity, and which is propagated to the neighbouring nodes.

According to a third aspect of the present invention there is provided a node for use in a multi-node telecommunications network, the node comprising:

- means for receiving on the or each incoming link to the node a Synchronisation Status Message incorporating the identities of the nodes through which the message has passed;
- means for registering the path or path length of the or each Synchronisation Status Message as an attribute for the link on which it was received;
- means for incorporating into one of the messages the identity of the node, thereby generating in the message a node path which has been followed by the message; and
- means for propagating the modified Synchronisation Status Message to neighbouring nodes using outgoing links, after a predefined time delay.

According to a fourth aspect of the present invention there is provided a method of synchronising nodes of a telecommunication network in which a master node is coupled to a Primary Reference Clock (PRC) and a plurality of slave nodes are each arranged to synchronise their internal clock to the PRC using data received on incoming data link, the method comprising:

- propagating Synchronisation Status Messages through the network from the master node, with each slave node through which a message passes incrementing a distance counter contained in the message, thereby generating in each message a path length taken by the message;
- introducing a delay in the propagation of the messages at at least certain of the network nodes; and
- for each of at least some of the incoming links of each node, registering the path length of a Synchronisation Status Message received on a link as an attribute for that link.

According to a fifth aspect of the present invention there is provided a method of synchronising nodes of a telecommunication network in which a master node is coupled to a Primary Reference Clock (PRC) and a plurality of slave nodes are each arranged to synchronise their internal clock to the PRC using data received on an incoming data link, the method comprising:

- propagating Synchronisation Status Messages through the network from the master node, with each node through which a message passes incorporating into the message its own identity, thereby generating in each message a path which has been followed by the message;
- for each incoming link of each slave node, registering the path or path length of a Synchronisation Status Message received on that link as an attribute for that link; and
- for each slave node, identifying the best incoming signalling link and synchronising on that link after a time delay, indicated by the path of the Synchronisation Status Message received on that link, has elapsed, assuming that no better link is identified in the meantime.

According to a sixth aspect of the present invention there is provided a method of synchronising a node of a telecommunication network in which a master node is coupled to a Primary Reference Clock (PRC) and a plurality of slave nodes are each arranged to synchronise their internal clock to the PRC using data received on incoming data link, the method comprising:

- sending a Synchronisation Status Message Request from the node to be synchronised to neighbouring nodes in the network;
- returning Synchronisation Status Messages from the neighbouring nodes to the requesting node, said messages including a path which has been followed by the message from the master node;
- synchronising said node on the incoming signalling link over which the message having the shortest path was received;
- extending the path of the message having the shortest path to include the identity the receiving node; and
- propagating the modified synchronisation message to at least certain of the neighbouring nodes.

According to a seventh aspect of the present invention there is provided a node for use in a multi-node telecommunications network, the node comprising:

- means for sending a Synchronisation Status Message Request to neighbouring nodes in the network;
- means for receiving on incoming links to the node, respective Synchronisation Status Messages incorporating the identities of the nodes through which the messages have passed;
- means for registering the paths or path lengths of the Synchronisation Status Messages as attributes for the respective links on which they were received;
- means for incorporating into the message having the shortest path length the identity of the node, thereby generating in the message a path which has been followed by the message; and
- means for propagating the modified Synchronisation Status Message to at least certain neighbouring nodes using outgoing links.

According to an eighth aspect of the present invention there is provided a method of synchronising a node of a telecommunication network in which a master node is coupled to a Primary Reference Clock (PRC) and a plurality of slave nodes are each arranged to synchronise their internal clock to the PRC using data received on incoming data link, the method comprising:

- sending a Synchronisation Status Message Request from the node to be synchronised to neighbouring nodes in the network;
- returning Synchronisation Status Messages from the neighbouring nodes to the requesting node, said messages including a path length which has been taken by the message from the master node;
- synchronising said node on the incoming signalling link over which the message having the shortest path length was received;
- extending the path of the message; and
- propagating the modified synchronisation message to at least certain of the neighbouring nodes.

DETAILED DESCRIPTION

Figure 1:
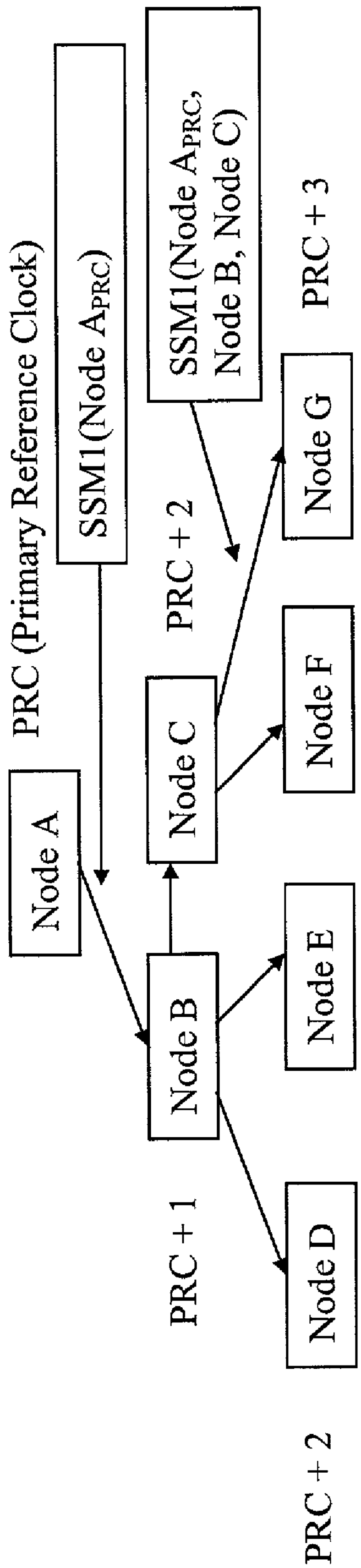
FIG. 1 illustrates schematically a multi-node telecommunication network.

There is illustrated in FIG. 1 a multi-node telecommunication network comprising Nodes A to G. The Nodes are interconnected by data links which may carry user data, signalling data, or a combination of both. In one example, the network of FIG. 1 might be a UMTS Terrestrial Radio Access Network (UTRAN), where certain of the nodes (for example Node A) might be Radio Network Controllers (RNCs) whilst others of the nodes (for example Nodes B to G) might be Radio Base Stations (RBSs).

Node A is a so-called "master Node" and is connected to a Primary Reference Clock (PRC). As has already been outlined above, the slave Nodes B to G are able to synchronise with another network Node (and hence with the network as a whole) using data signals received on an incoming data links. The accuracy of the synchronisation will depend to a large extent upon the remoteness of the node which is being synchronised from the master node. An important consideration therefore in choosing which incoming link to synchronise on is the number of inter-node hops which a signal has taken to arrive at the node from the master node.

Upon initialisation of the network of FIG. 1, Node A initiates the synchronisation selection process by sending a Synchronisation Status Message (SSM) to each of the nodes to which it is connected (in this case only Node B). The SSM includes a "path" field in which Node A places its own identity together with an indication that Node A is the master node. The SSM is received on a given incoming signalling link by Node B. Node B analyses the SSM and identifies the path. The path is stored as an attribute for the incoming signalling link. Node B then adds its own identity to the path field of the SSM (which becomes {Node $A_{PRC}$, Node B}), and propagates the modified SSM to Nodes C, D, and E to which it is connected.

The receiving nodes again store the path contained in the received SSM as an attribute for the link on which the message is received. Whilst Nodes D and E are not connected to any further nodes, Node C is connected to Nodes F and G. Node C therefore adds its identity to the SSM path field (now {Node $A_{PRC}$, Node B, Node C}) and propagates it to Nodes F and G. Nodes F and G are not connected to any further Nodes and therefore the SSM propagation terminates at these nodes. The path contained in the SSM is stored as an attribute for the incoming links to Nodes F and G.

Figure 2:
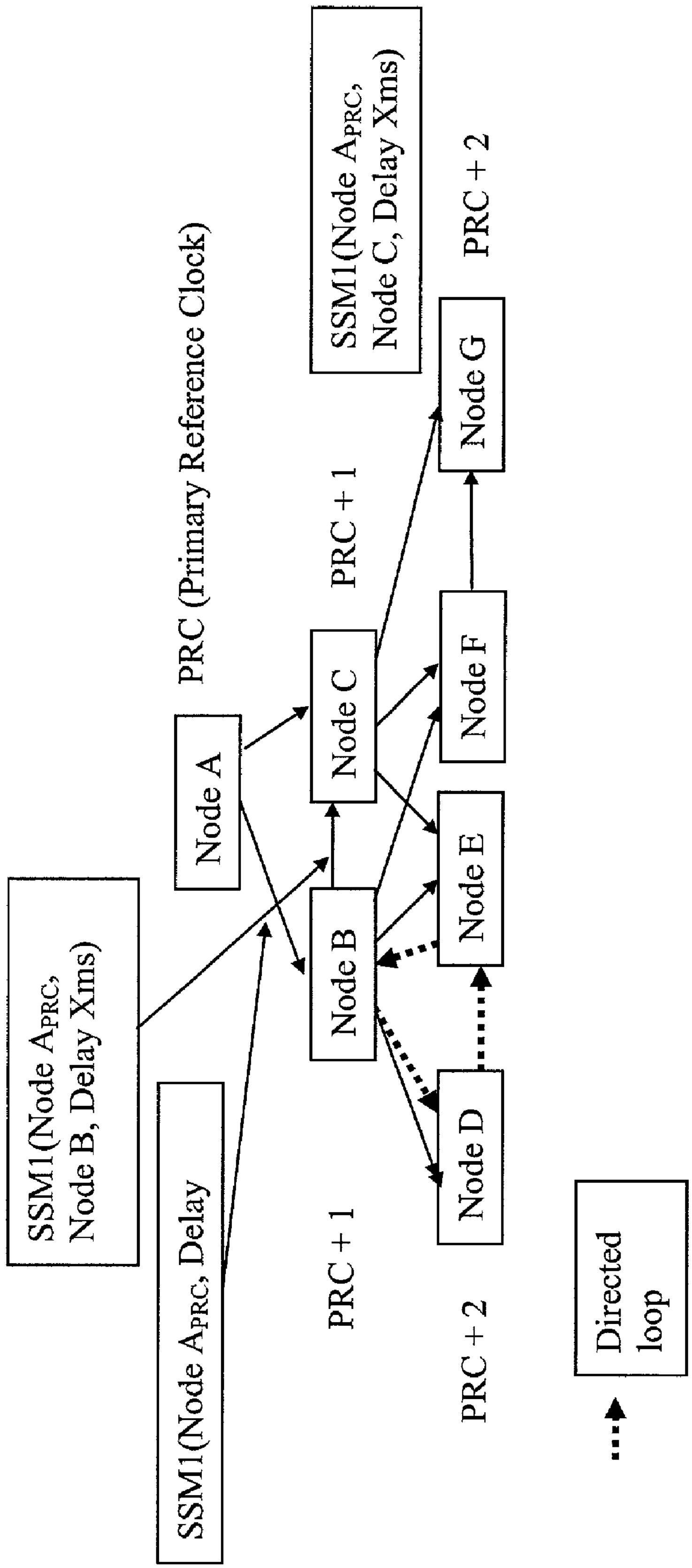
FIG. 2 illustrates schematically an alternative multi-node telecommunication network prior to synchronisation.
Figure 3:
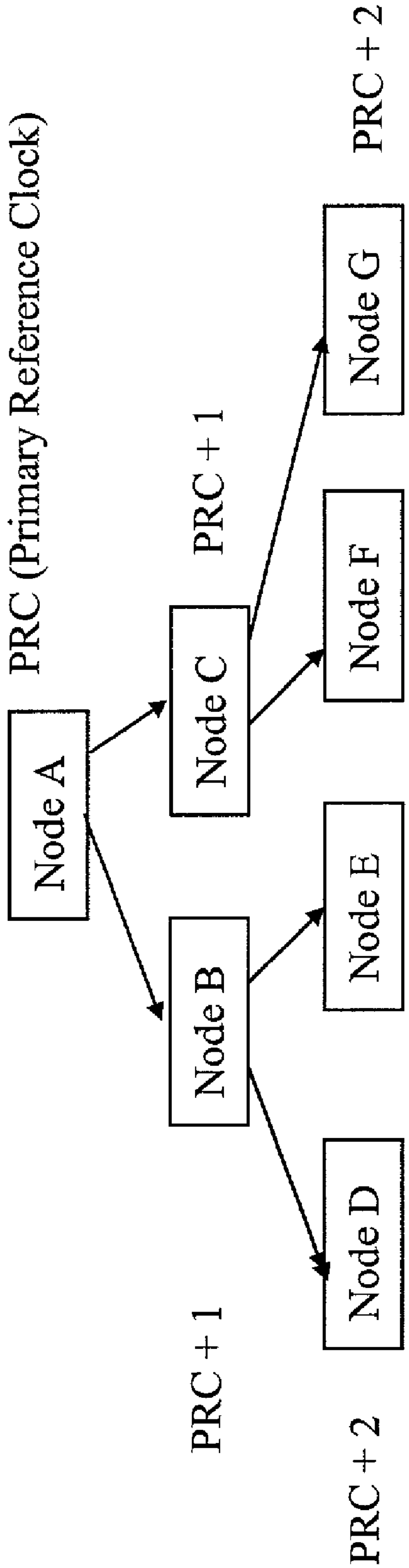
FIG. 3 illustrates the network of FIG. 2 following synchronisation.

In the very simple example of FIG. 1, each Node has only a single incoming data link on which to synchronise. FIG. 2 illustrates a modified network in which an additional link exists between Nodes A and C. In this network, upon initialisation, Node C will receive an SSM from both Nodes A and B. The path contained in the SSM received from Node A will be {Node $A_{PRC}$} whilst that contained in the SSM received from Node B will be {Node $A_{PRC}$, Node B}. In the event that the network is fully operational, Node C will select the incoming link from Node A as the link to synchronise on. It does this by comparing the attributes allocated to those links as a result of the respective SSMs. Node C will only choose to synchronise on the incoming link from Node B in the event that the link from Node A fails. FIG. 3 illustrates the network of FIG. 2 following synchronisation. It will be appreciated that this selection process can be extended to selection from three or more incoming links.

It will also be appreciated that Node C will only propagate to Nodes F and G (at least when the network is fully operational) the SSM which is received from Node A. Only in the event that the link to Node A fails will Node C propagate the SSM received from Node B to Node F and G.

FIG. 2 illustrates using dashed lines a so-called "directed loop" which might arise when Node D is connected to Node E and Node E is connected back to Node B. In this situation, an SSM propagated from Node E to Node B will include the path {Node $A_{PRC}$, Node B, Node D, Node E}. Node B will find that its own identity is contained in the path and hence will detect a directed loop.

It will be appreciated that where a Node has several incoming links on which SSMs may be received, it is possible that a node might end up receiving an SSM having a relatively long path before subsequently receiving an SSM having a shorter path. The result will be that the Node will first synchronise on the link on which the first SSM is received and will subsequently have to re-synchronise on the link on which the second SSM is received. This behaviour can result in a relatively long stabilisation time for the network.

Figure 4:
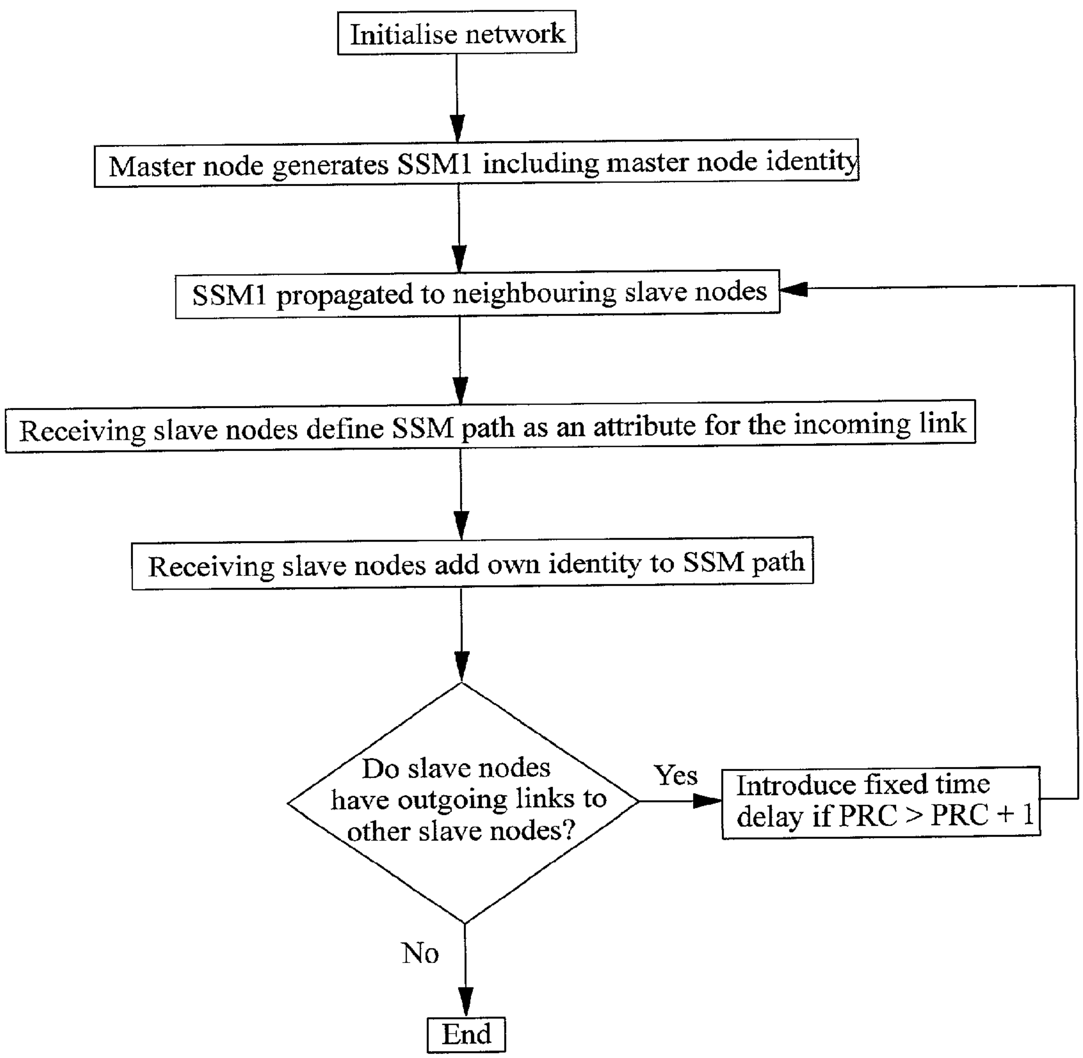
FIG. 4 is a flow diagram illustrating a method of synchronising the nodes of the network of FIGS. 2 and 3.

The problem can be mitigated by introducing a delay in the re-transmission of SSMs at each of the slave nodes. Providing this delay is sufficiently long, it will increase the probability that an SSM travelling over a shorter path will be received at a node before SSMs travelling over longer paths. FIG. 4 is a flow diagram illustrating this method.

In a modification to the above embodiment, in addition to adding its identity to the path of an SSM, a Node might add its synchronisation reference distance to the SSM. For example (with reference to FIG. 2), the Master Node A would add a distance PRC to the SSM, whilst Nodes B and C would add a distance PRC+1, Nodes D, E, F, and G would add a distance PRC+2 etc. It is then a simple operation for a Node to determine the synchronisation quality of an incoming link.

Figure 5:
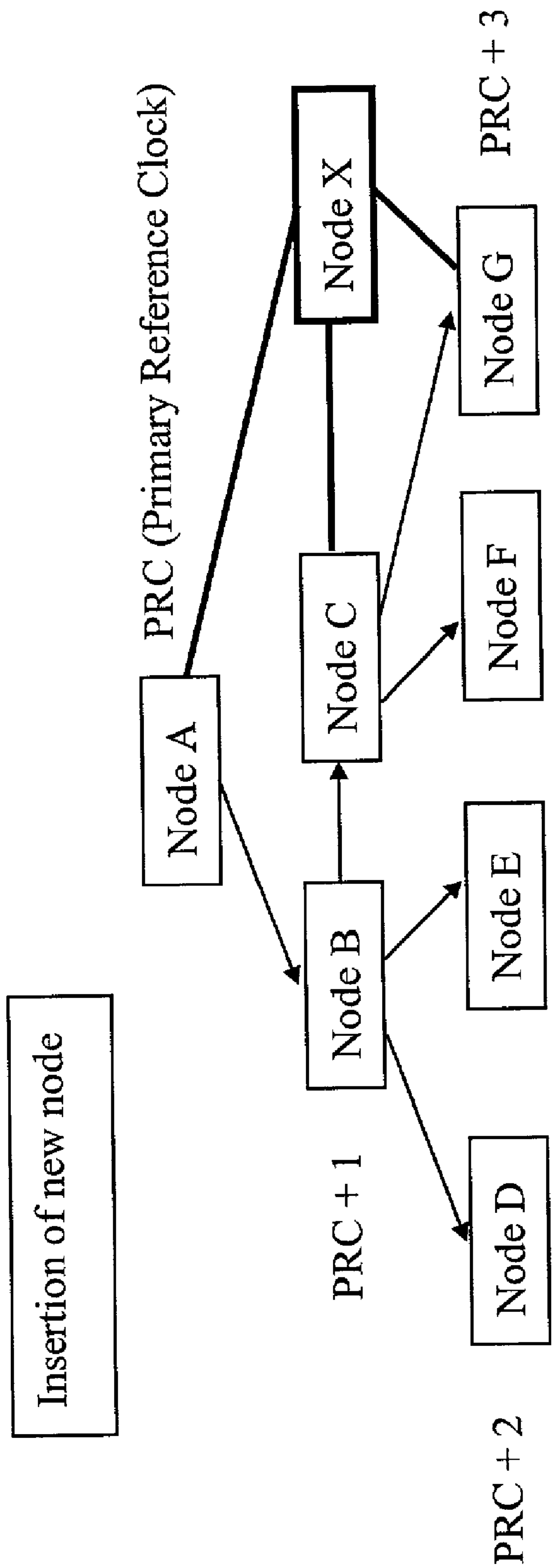
FIG. 5 illustrates schematically a multi-node telecommunication network prior to synchronisation, and comprising a new node.
Figure 6:
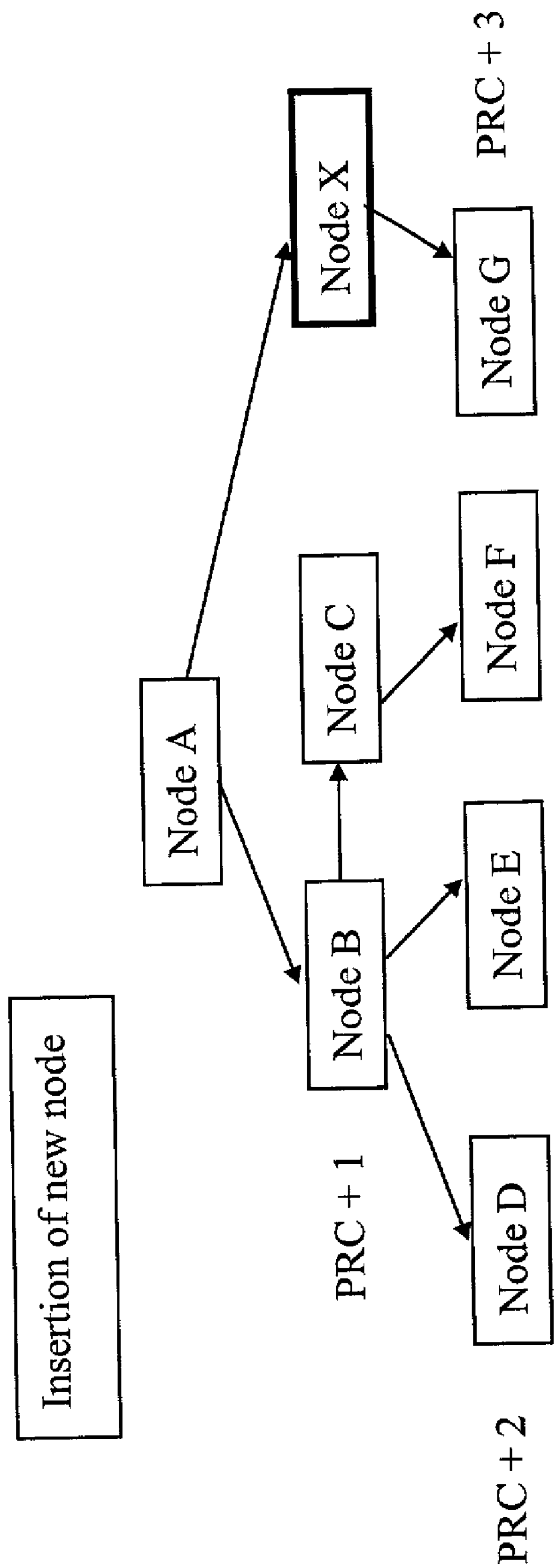
FIG. 6 illustrates the network of FIG. 5 following synchronisation.
Figure 7:
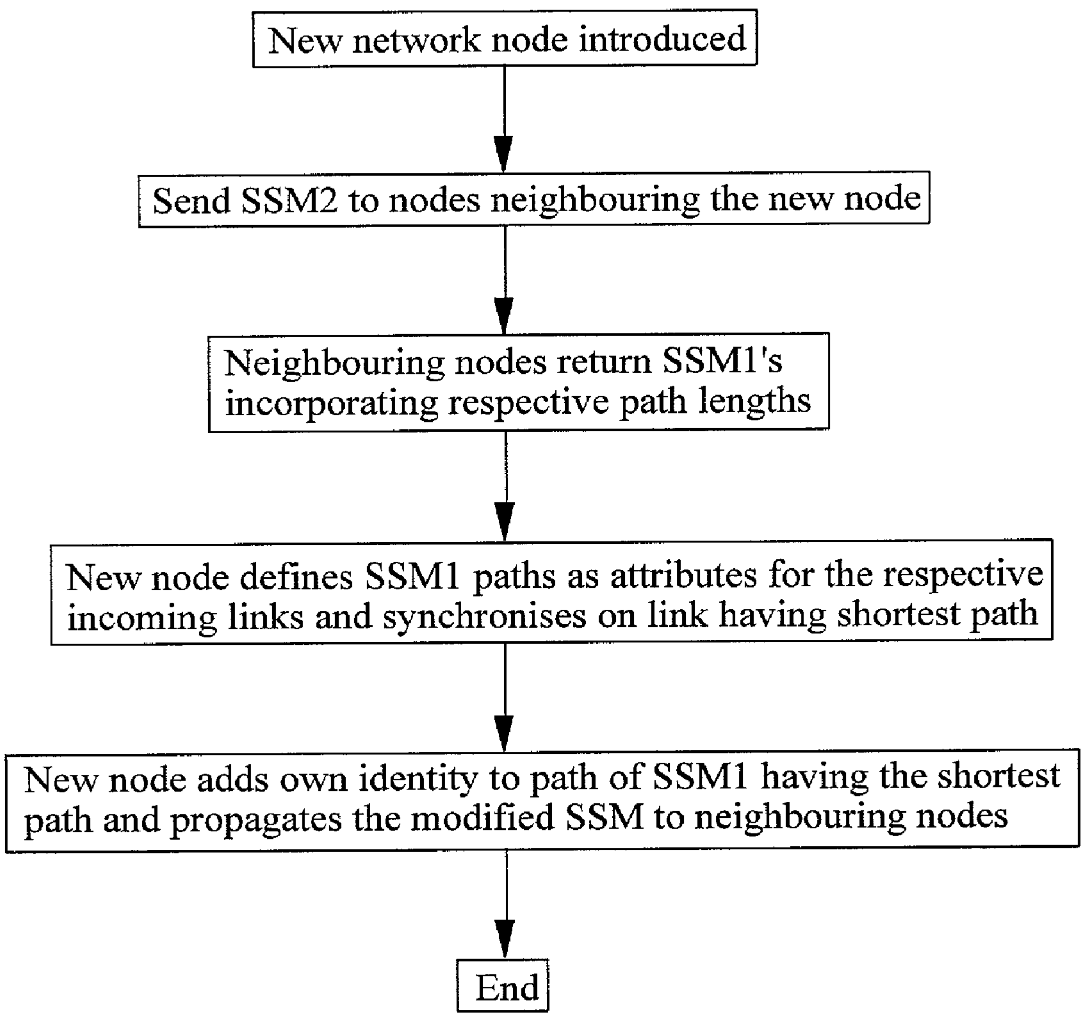
FIG. 7 is a flow diagram illustrating a method of synchronising a new node introduced into a multi-node telecommunication network.

In a further modification to the above embodiment, a second SSM message, referred to here as a Synchronisation Status Message Request (SSM2), may be introduced. This message is generated by a Node and is sent to neighbouring Nodes, requesting that these Nodes return to the enquiring Node an SSM of the first form (SSM1). This procedure may be used for example by a new Node X introduced to an existing network. Such a scenario is illustrated in FIG. 5, with FIG. 6 illustrating the situation after synchronisation has been achieved. FIG. 7 is a flow diagram illustrating this method.

It will be appreciated by the person of skill in the art that various modifications may be made to the above described embodiment without departing from the scope of the present invention. For example, a delay on acting upon a received SSM may be introduced at receiving slave nodes (rather than delaying the sending of the message). This delay provides an opportunity for other SSMs to arrive at the node (and which may have travelled over a shorter path) prior to synchronisation occurring.

What is claimed is:

1. A method of synchronizing nodes of a telecommunication network in which a master node is coupled to a Primary Reference Clock (PRC) and a plurality of slave nodes are arranged to synchronize their internal clocks to the PRC using data received on incoming data links, the method comprising:

- propagating Synchronization Status Messages through the network from the master node, said propagating step including:
  - in each given slave node through which a Message passes, modifying the Message by incorporating into the Message, an identity of the given slave node, thereby generating in each Message, a path and path length which has been followed by the Message; and
  - in slave nodes that are not neighboring nodes of the master node, delaying a predefined time period after receiving a Message before transmitting the modified message to a next slave node in the network;
- in each slave node that receives a Message, registering the path or path length of the received message as an attribute for the incoming data link on which the Message was received; and
- if multiple Messages are received on different incoming data links in a given slave node, selecting by the given slave node, an incoming data link having an attribute indicating the shortest path length from the master node as the link on which to synchronize.

2. The method claim 1, further comprising propagating Synchronization Status Messages upon initializing a new network.

3. The method of claim 1, further comprising sending Synchronization Status Messages at intervals to enable the network to cope with dynamic changes in network architecture.

4. The method of claim 1, wherein Synchronization Status Messages are generated in response to receipt at the master node of a Synchronization Status Request Message sent from another network node.

5. The method of claim 1, further comprising generating a Synchronization Status Message at a slave node in response to receipt at that slave node of a Synchronization Status Request Message sent from a neighboring slave node, with the Synchronization Status Message including an identification of the path over which the sending slave node has been synchronized.

6. The method of claim 1, wherein a node through which a Synchronization Status Message passes adds to the Message its own distance from the master node and, for each incoming link, a node registers the distance included in a Synchronization Status Message received on that link as an attribute for that link.

7. The method of claim 1, wherein the network is a UMTS network.

8. The method of claim 1, wherein the predefined time period delayed by a slave node is the same for all slave nodes that are not neighboring nodes of the master node.

9. The method of claim 1, wherein the predefined time period delayed by a slave node increases with increasing distance from the master node.

10. The method of claim 1, wherein the predefined time period delayed by a slave node is identified in the Synchronization Status Message.

11. The method of claim 1, wherein the predefined time period delayed by a slave node is defined by an additional delay table stored at the node.

12. A telecommunications network, comprising a master node coupled to a Primary Reference Clock (PRC) and a plurality of slave nodes, each of the slave nodes being arranged to synchronize its internal clock to the PRC using data received on an incoming data link, and each of the slave nodes comprising:

means for receiving on an incoming link to the slave node, a Synchronization Status Message incorporating identities of the slave nodes through which the Message has passed;

means for registering a path or path length of the Synchronization Status Message as an attribute for the link on which it was received;

means for modifying a received Message by incorporating into the received Message, the identity of the receiving slave node, thereby generating in the Message, a path and path length which has been followed by the Message; and means for propagating a Synchronization Status Message having an incorporated identity to a next slave node in the network using an outgoing link, wherein slave nodes that are not neighboring nodes of the master node are configured to delay a predefined time period after receiving a Message before transmitting the modified message to a next slave node in the network.

13. A slave node for use in a multi-node telecommunications network having a master node coupled to a Primary Reference Clock (PRC) and a plurality of slave nodes, comprising:

means for receiving on an incoming link to the node a Synchronization Status Message incorporating identities of nodes through which the Message has passed;

means for registering a path or path length of a Synchronization Status Message as an attribute for the link on which it was received;

means for modifying a received Message by incorporating into the received Message, an identity of the node, thereby generating in the Message, a node path and path length which has been followed by the Message;

means for propagating the modified Message to neighboring nodes using outgoing links, wherein a slave node that is not a neighboring node of the master node is configured to delay a predefined time period after receiving a message before transmitting the modified message to a next slave node in the network; and means responsive to receiving multiple Messages on different incoming links, for selecting an incoming link having an attribute indicating the shortest path length from the master node as the link on which to synchronize.

14. A method of synchronizing nodes of a telecommunication network in which a master node is coupled to a Primary Reference Clock (PRC) and a plurality of slave nodes are arranged to synchronize their internal clocks to the PRC using data received on incoming data links, the method comprising:

propagating Synchronization Status Messages through the network from the master node, with each slave node through which a Message passes incrementing a distance counter contained in the Message, thereby generating in each Message a path length taken by the Message;

waiting a predetermined amount of time to introduce an additional delay in the propagation of the Messages in slave nodes that are not neighboring nodes of the master node;

for each of at least some of the incoming links of each slave node, registering the path length of a Synchronization Status Message received on a link as an attribute for that link; and if multiple Messages are received on different incoming links in a given slave node, selecting by the given slave node, an incoming link having an attribute indicating the shortest path length from the master node as the link on which to synchronize.

* * * * *